(12) United States Patent
Yavuz et al.

(10) Patent No.: US 8,737,317 B2
(45) Date of Patent: May 27, 2014

(54) AUTONOMOUS CARRIER SELECTION FOR FEMTOCELLS

(75) Inventors: Mehmet Yavuz, San Diego, CA (US); Farhad Meshkati, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/463,695

(22) Filed: May 11, 2009

(65) Prior Publication Data

US 2009/0285113 A1 Nov. 19, 2009

Related U.S. Application Data

(60) Provisional application No. 61/052,905, filed on May 13, 2008.

(51) Int. Cl.
*H04W 4/00* (2009.01)

(52) U.S. Cl.
USPC .......................................... 370/329; 455/450

(58) Field of Classification Search
USPC ......... 370/252, 336, 331, 332, 328, 338, 254, 370/329, 389, 342, 311, 350, 310, 312, 322, 370/317, 318, 319, 320, 321, 431, 442, 443, 370/444, 437; 455/67.11, 432.1, 435.2, 455/434, 436, 450, 452.2, 445, 411, 414.1, 455/446
See application file for complete search history.

(56) References Cited

U.S. PATENT DOCUMENTS

| 5,396,516 A | 3/1995 | Padovani et al. |
| 5,606,727 A | 2/1997 | Ueda |
| 5,832,378 A | 11/1998 | Zicker et al. |

(Continued)

FOREIGN PATENT DOCUMENTS

| CN | 1497888 A | 5/2004 |
| CN | 1513275 A | 7/2004 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8); 3GPP TS 36.304 V8.1 .0" 3rd Generation Partnership Project (3GPP), Mar. 1, 2008.

(Continued)

*Primary Examiner* — Abdullah Riyami
(74) *Attorney, Agent, or Firm* — Fariba Yadegar-Bandari

(57) ABSTRACT

A carrier for a femtocell is selected from a set of carriers available to femtocells. The femto node determines a preference order for the set and measures received signal strength (RSS) for each carrier. The femto node determines a least interference carrier from the set based on the RSS for each carrier, then defines a selected carrier for the femtocell by comparing the RSS of the least interference carrier to the RSS of other carriers in the set. The selected carrier may have a RSS larger than or equal to the RSS of the least interference carrier offset by a predefined margin. The comparisons may be performed in the preference order. The set available to femto nodes may be a subset of all carriers available to a combination of femtocells and macrocells and one or more of the carriers available to femtocells also may be a carrier available to macrocells.

26 Claims, 10 Drawing Sheets

(56) References Cited

U.S. PATENT DOCUMENTS

| | | | |
|---|---|---|---|
| 5,839,063 A | 11/1998 | Lee | |
| 5,884,145 A | 3/1999 | Haartsen | |
| 6,223,031 B1 | 4/2001 | Naslund | |
| 6,643,520 B1 | 11/2003 | Park et al. | |
| 7,512,379 B2* | 3/2009 | Nguyen | 455/41.2 |
| 7,536,626 B2 | 5/2009 | Sutivong et al. | |
| 2002/0160798 A1 | 10/2002 | Shoji et al. | |
| 2003/0161268 A1 | 8/2003 | Larsson et al. | |
| 2004/0127191 A1 | 7/2004 | Matsunaga | |
| 2004/0132410 A1* | 7/2004 | Hundal et al. | 455/67.13 |
| 2005/0148368 A1 | 7/2005 | Scheinert et al. | |
| 2006/0089141 A1 | 4/2006 | Ho et al. | |
| 2006/0099987 A1 | 5/2006 | Singh et al. | |
| 2006/0183481 A1 | 8/2006 | Furukawa et al. | |
| 2006/0209764 A1 | 9/2006 | Kim et al. | |
| 2007/0047493 A1 | 3/2007 | Park et al. | |
| 2007/0047494 A1* | 3/2007 | Cordone | 370/335 |
| 2007/0097939 A1 | 5/2007 | Nylander et al. | |
| 2007/0105574 A1 | 5/2007 | Gupta et al. | |
| 2007/0238448 A1 | 10/2007 | Gallagher et al. | |
| 2008/0057934 A1 | 3/2008 | Sung et al. | |
| 2008/0076425 A1 | 3/2008 | Khetawat et al. | |
| 2008/0102877 A1 | 5/2008 | Suemitsu et al. | |
| 2009/0042595 A1 | 2/2009 | Yavuz et al. | |
| 2009/0042596 A1* | 2/2009 | Yavuz et al. | 455/522 |
| 2009/0052395 A1 | 2/2009 | Bao et al. | |
| 2009/0061873 A1* | 3/2009 | Bao et al. | 455/436 |
| 2009/0111499 A1 | 4/2009 | Bosch et al. | |
| 2009/0135790 A1* | 5/2009 | Yavuz et al. | 370/336 |
| 2009/0252088 A1 | 10/2009 | Rao et al. | |
| 2009/0258644 A1* | 10/2009 | Osborn | 455/432.1 |
| 2009/0280819 A1* | 11/2009 | Brisebois et al. | 455/446 |
| 2009/0285172 A1* | 11/2009 | Hansen et al. | 370/329 |
| 2009/0286496 A1 | 11/2009 | Yavuz et al. | |
| 2009/0286545 A1 | 11/2009 | Yavuz et al. | |
| 2010/0118801 A1 | 5/2010 | Yavuz et al. | |
| 2010/0151870 A1* | 6/2010 | Piercy et al. | 455/450 |
| 2010/0323663 A1 | 12/2010 | Vikberg et al. | |
| 2011/0003597 A1* | 1/2011 | Budic et al. | 455/450 |
| 2011/0021240 A1 | 1/2011 | Hiltunen et al. | |
| 2011/0028170 A1 | 2/2011 | Sawai | |
| 2011/0028179 A1 | 2/2011 | Sawai et al. | |
| 2011/0110254 A1 | 5/2011 | Ji et al. | |

FOREIGN PATENT DOCUMENTS

| | | |
|---|---|---|
| CN | 1894979 A | 1/2007 |
| CN | 101052193 A | 10/2007 |
| CN | 101128994 A | 2/2008 |
| EP | 1638247 A1 | 3/2006 |
| EP | 1806651 A2 | 7/2007 |
| EP | 1806851 A2 | 7/2007 |
| EP | 1843618 | 10/2007 |
| GB | 2266433 A | 10/1993 |
| JP | 2001238252 A | 8/2001 |
| JP | 2001513970 A | 9/2001 |
| JP | 2002536905 A | 10/2002 |
| JP | 2004207839 A | 7/2004 |
| JP | 2007268785 A | 10/2007 |
| JP | 2007529915 A | 10/2007 |
| JP | 2008081250 A | 3/2008 |
| JP | 2008098369 A | 4/2008 |
| RU | 2114508 | 6/1998 |
| RU | 2168871 C2 | 6/2001 |
| RU | 2232484 C2 | 7/2004 |
| RU | 2304853 C2 | 8/2007 |
| TW | 200812352 A | 3/2008 |
| WO | 0008706 A2 | 2/2000 |
| WO | WO-0046929 A1 | 8/2000 |
| WO | 2005015917 A2 | 2/2005 |
| WO | WO2006007318 A1 | 1/2006 |
| WO | WO2006010958 A2 | 2/2006 |
| WO | 2006079689 A1 | 8/2006 |
| WO | WO2006091172 A1 | 8/2006 |
| WO | 2006117838 A1 | 11/2006 |
| WO | 2007024895 A2 | 3/2007 |
| WO | 2007040449 A1 | 4/2007 |
| WO | WO2008025874 A1 | 3/2008 |
| WO | 2009039404 | 3/2009 |

OTHER PUBLICATIONS

"3rd Generation Partnership Project; Technical Specification Group Radio Access Networks; 3G Home Node B Study Item Technical Report (Release 8); 3GPP TR 25.820 V8.0.0" 3rd Generation Partnership Project (3GPP), Mar. 1, 2008, pp. 1-37.

Claussen H et al: "An overview of the femtocell concept" Bell Labs Technical Journal, Wiley, CA, US, vol. 1, No. 13, Mar. 21, 2008, pp. 221-245, XP001512256 ISSN: 1089-7089 abstract p. 224, left-hand column—p. 225, left-hand column p. 227, paragraphs Auto-Configuration,Downlink,Uplink figure 2.

International Search Report and Written Opinion—PCT/US2009/043670, International Search Authority, European Patent Office, Oct. 14, 2009.

Patrick Agyapong et al: "Interference Tolerance Signaling Using TDD Busy Tone Concept" Vehicular Technology Conference, 2007. VTC2007—Spring. IEEE 65th, IEEE, PI, Apr. 1, 2007, pp. 2850-2854, XP031093151. ISBN: 9781-4244-0266-3.

Vikram Chandrasekhar et al: "Uplink Capacity and Interference Avoidance for Two-Tier Cellular Networks" Global Telecommunications Conference, 2007. GLOBECOM '07. IEEE, Piscataway, NJ, USA, Nov. 1, 2007, pp. 3322-3326, XP031196558.

Taiwan Search Report—TW098115887—TIPO—Aug. 16, 2012.

Ericsson, "Home Node B output power", R4-070969, 3GPP TSG-RAN Working Group 4 (Radio) meeting #43bis Orlando, USA, Jun. 25-29, 2007.

Fan et al., "Interference Management in Femto Cell Deployment", 3GPP2, S00-FEMTO-20071015-025_QCOM Femto Interference Management, Oct. 15, 2007.

* cited by examiner

ID UNDER 35 U.S.C. §119

AUTONOMOUS CARRIER SELECTION FOR FEMTOCELLS

CLAIM OF PRIORITY UNDER 35 U.S.C. §119

This application claims the benefit of and priority to commonly owned U.S. Provisional Patent Application No. 61/052,905, filed May 13, 2008, which is hereby incorporated by reference herein.

REFERENCE TO CO-PENDING APPLICATIONS FOR PATENT

This application is related to concurrently filed and commonly owned: U.S. patent application Ser. No. 12/463,701, entitled "Autonomous Downlink Code Selection for Femto Cells;" and U.S. patent application Ser. No. 12/463,705, entitled "Transmit Power Selection for User Equipment Communicating with Femto Cells;" the disclosures of each of which is hereby incorporated by reference herein.

BACKGROUND

1. Field

This application relates generally to wireless communication and more specifically, but not exclusively, to improving communication performance.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs, or femto cells and may be used to provide more robust indoor wireless coverage to mobile units. Typically, such small-coverage base stations are connected to the Internet and the mobile operator's network via a Digital Subscriber Line (DSL) router or a cable modem.

In a typical macro cellular deployment the RF coverage is planned and managed by cellular network operators to optimize coverage between macro base stations. Femto base stations, on the other hand, may be installed by the subscriber personally and deployed in an ad-hoc manner. Consequently, femto cells may cause interference both on the uplink (UL) and downlink (DL) of the macro cells. For example, a femto base station installed near a window of a residence may cause significant downlink interference to any access terminals outside the house that are not served by the femto cell. Also, on the uplink, home access terminals that are served by a femto cell may cause interference at a macro cell base station (e.g., macro NodeB).

Femto cells also may interfere with one another and macrocells as a result of unplanned deployment. For example, in a multi-resident apartment, a femto base station installed near a wall separating two residences may cause significant interference to a femto base station in a neighboring residence. Here, the strongest femto base station seen by a home access terminal (e.g., strongest in terms of RF signal strength received at the access terminal) may not necessarily be the serving base station for the access terminal due to a restricted association policy enforced by that femto base station.

Thus, interference issues may arise in a communication system where radio frequency (RF) coverage of femto base stations is not optimized by the mobile operator and where deployment of such base stations is ad-hoc. Consequently, there is a need for improved interference management for wireless networks.

Figure 1:
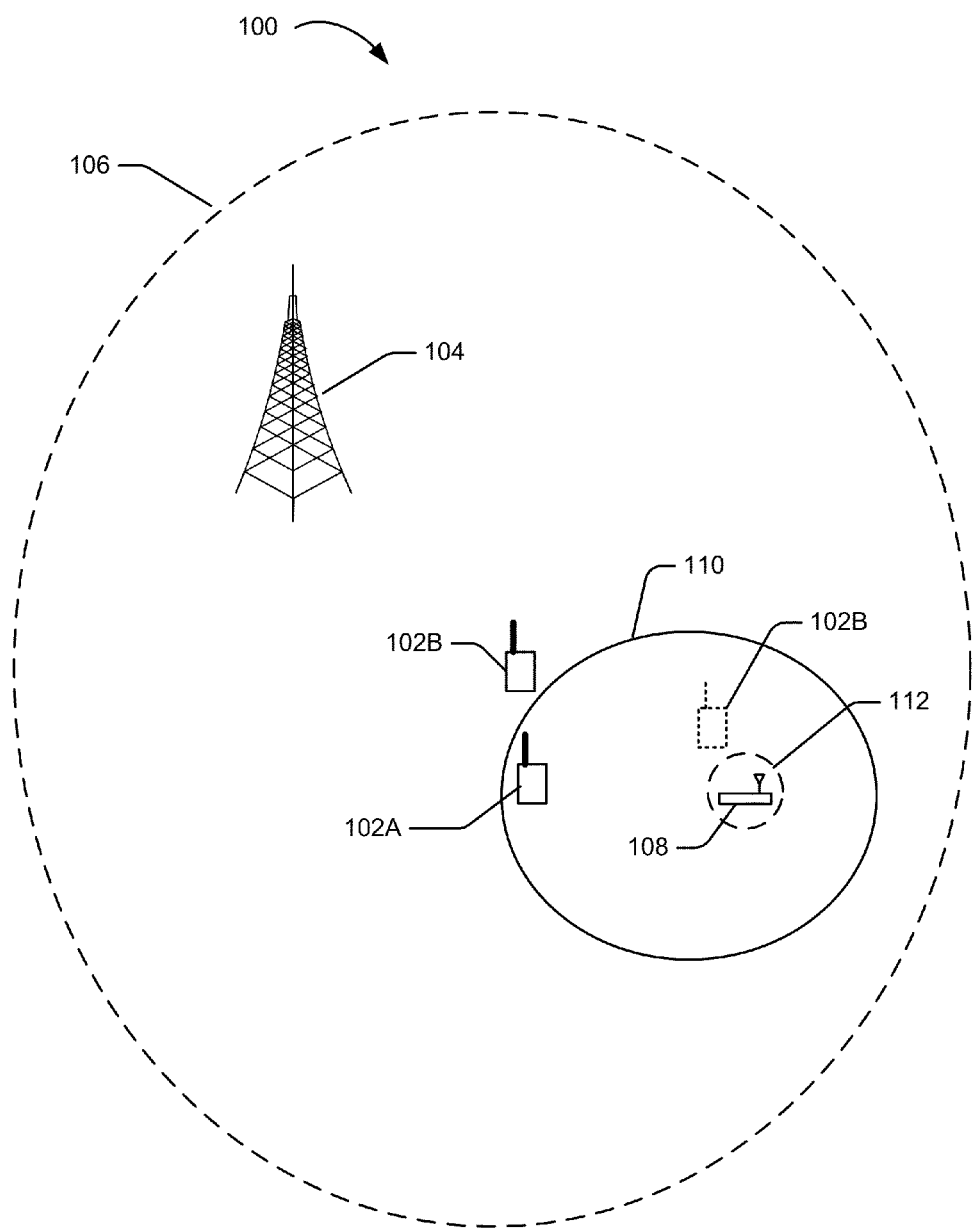
FIG. 1 is a simplified diagram of several sample aspects of a communication system including macro coverage and smaller scale coverage.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Various embodiments of the disclosure are described below. It should be apparent that the teachings herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented, or a method may be practiced, using any number of the embodiments set forth herein. In addition, such an apparatus may be implemented, or such a method may be practiced, using other structure, functionality, or structure and functionality in addition to or other than one or more of the embodiments set forth herein.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, High-Speed Downlink Packet Access (HSDPA) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA.

Although certain embodiments of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

FIG. 1 illustrates a network system 100 that includes macro scale coverage (e.g., a large area cellular network such as a 3G network, which may be commonly referred to as a macro cell network) and smaller scale coverage (e.g., a residence-based or building-based network environment). As a node such as access terminal 102A moves through the network, the access terminal 102A may be served in certain locations by macro access nodes 104 (also referred to herein as macro nodes) that provide macro coverage as represented by a macro coverage area 106 while the access terminal 102A may be served at other locations by small scale access nodes 108 (also referred to herein as small scale nodes) that provide smaller scale coverage as represented by the small scale coverage area 110. In some aspects, the small scale nodes 108 may be used to provide incremental capacity growth, in-building coverage, and different services (e.g., for a more robust user experience).

As will be discussed in more detail below, the small scale access node 108 may be restricted in that it may not provide certain services to certain nodes (e.g., an indoor access terminal 102B). As a result, a coverage hole may be created in the macro coverage area 106.

The size of the coverage hole may depend on whether the macro access node 104 and the small scale node 108 are operating on the same frequency carrier. For example, when the nodes 104 and 108 are on a co-channel (e.g., using the same frequency carrier), the coverage hole may correspond closely to the small scale coverage area 110. Thus, in this case the access terminal 102A may lose macro coverage when it is within the small scale coverage area 110 (e.g., as indicated by the phantom view of the access terminal 102B).

A small scale node 108 may be, for example, a femto node or a pico node. A femto node may be an access node that has a limited coverage area, such as for example a home or apartment. A node that provides coverage over an area that is smaller than a macro area and larger than a femto area may be referred to as a pico node (e.g., providing coverage within a commercial building). It should be appreciated that the teachings herein may be implemented with various types of nodes and systems. For example, a pico node or some other type of node may provide the same or similar functionality as a femto node for a different (e.g., larger) coverage area. Thus, as discussed more fully below, like a femto node, a pico node may be restricted, a pico node may be associated with one or more home access terminals, and so on.

When the nodes 104 and 108 are on adjacent channels (e.g., using different frequency carriers), a smaller coverage hole 112 may be created in the macro coverage area 106 as a result of adjacent channel interference from the small scale node 108. Thus, when the access terminal 102A is operating on an adjacent channel, the access terminal 102A may receive macro coverage at a location that is closer to the small scale node 108 (e.g., just outside the smaller coverage hole 112).

Depending on system design parameters, the co-channel coverage hole may be relatively large. For example, when the transmit power of the small scale node 108 is 0 dBm, the radius for which the interference of the small scale node 108 is at least the same as the thermal noise floor may be on the order of 40 meters, assuming free space propagation loss and a worst case where there is no wall separation between the small scale node 108 and access terminal 102B A tradeoff thus exists between minimizing the outage in the macro coverage area 106 while maintaining adequate coverage within a designated smaller scale environment (e.g., femto node 108 coverage inside a home). For example, when a restricted femto node 108 is at the edge of the macro coverage area 106, as a visiting access terminal approaches the femto node 108, the visiting access terminal is likely to lose macro coverage and drop the call. In such a case, one solution for the macro cellular network would be to move the visitor access terminal to another carrier (e.g., where the adjacent channel interference from the femto node is small). Due to limited spectrum available to each operator, however, the use of separate carrier frequencies may not always be practical. Consequently, a visitor access terminal associated with that other operator may suffer from the coverage hole created by the restricted femto node 108 on that carrier.

Figure 2:
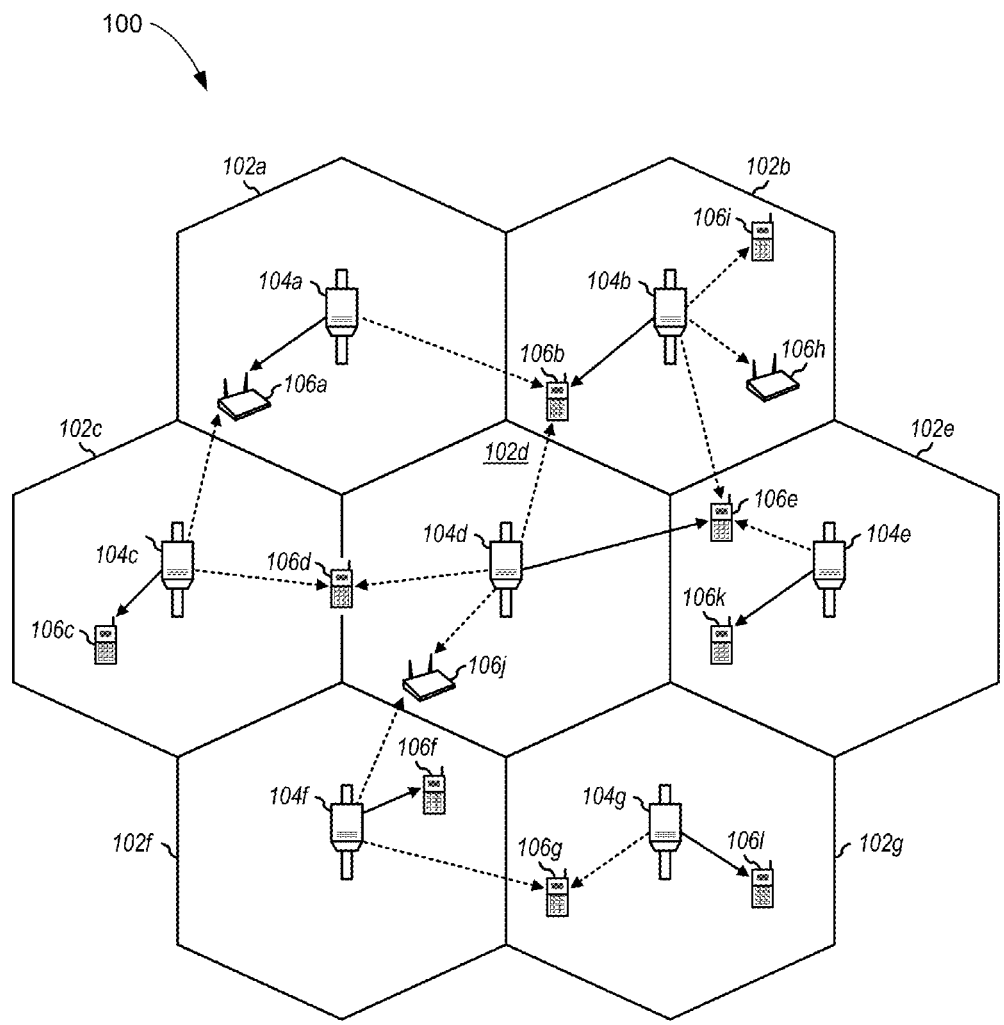
FIG. 2 is another representation of the wireless communication system configured to support a number of users, in which various disclosed embodiments and aspects may be implemented.

FIG. 2 illustrates another representation of the wireless communication system 100 configured to support a number of users, in which various disclosed embodiments and aspects may be implemented. As shown in FIG. 2, by way of example, wireless communication system 100 provides communication for multiple cells, such as, for example, macro cells 102a-102g, with each cell being serviced by a corresponding access point (AP) 104 (such as APs 104a-104g). Each cell may be further divided into one or more sectors. Various access terminals (ATs) 106 (e.g., ATs 102a-102k) also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102a-102g may cover a few blocks in a neighborhood.

In various applications, other terminology may be used to reference a macro node 104, a femto node 108, or a pico node. For example, a macro node 104 may be configured or referred to as an access node, base station, access point, eNodeB, macro cell, macro NodeB (MNB), and so on. Also, a femto node 108 may be configured or referred to as a home NodeB (HNB), home eNodeB, access point base station, femto cell, and so on. Also, a cell associated with a macro node, a femto node, or a pico node may be referred to as a macro cell, a femto cell, or a pico cell, respectively.

As mentioned above, a femto node 108 may be restricted in some aspects. For example, a given femto node 108 may only provide service to a limited set of access terminals 102. Thus, in deployments with so-called restricted (or closed) association, a given access terminal 102 may be served by the macro cell mobile network and a limited set of femto nodes 108 (e.g., femto nodes that reside within a corresponding user residence).

The restricted provisioned set of access terminals 102 associated with a restricted femto node 108 (which may also be referred to as a Closed Subscriber Group Home NodeB) may be temporarily or permanently extended as necessary. In some aspects, a Closed Subscriber Group (CSG) may be defined as the set of access nodes (e.g., femto nodes) that share a common access control list of access terminals. In some implementations, all femto nodes (or all restricted femto nodes) in a region may operate on a designated channel, which may be referred to as the femto channel.

Various relationships may be defined between a restricted femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate. A guest femto node may refer to a femto node on which an access terminal is temporarily authorized to access or operate. An alien femto node may refer to a femto node on which the access terminal is not authorized to access or operate, except for perhaps emergency situations (e.g., 911 calls).

From the perspective of a restricted femto node, a home access terminal (or home user equipment, "HUE") may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations such as 911 calls. Thus, in some aspects an alien access terminal may be defined as one that does not have the credentials or permission to register with the restricted femto node. An access terminal that is currently restricted (e.g., denied access) by a restricted femto cell may be referred to herein as a visitor access terminal. A visitor access terminal may thus correspond to an alien access terminal when service is not allowed and a guest access terminal when service is allowed temporarily.

Figure 3:
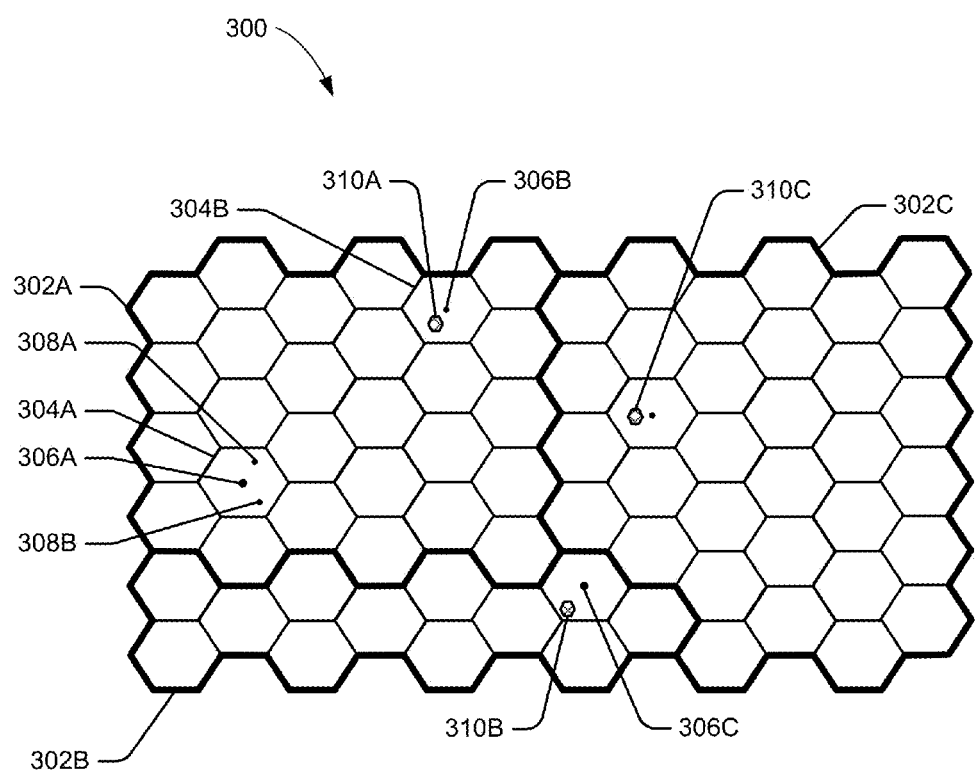
FIG. 3 is a simplified diagram illustrating coverage areas for wireless communication.

FIG. 3 illustrates an example of a coverage map 300 for a network where several tracking areas 302 (or routing areas or location areas) are defined. Specifically, areas of coverage associated with tracking areas 302A, 302B, and 302C are delineated by the wide lines in FIG. 3.

The system provides wireless communication via multiple cells 304 (represented by the hexagons), such as, for example, macro cells 304A and 304B, with each cell being serviced by a corresponding access node 306 (e.g., access nodes 306A-306C). As shown in FIG. 3, access terminals 308 (e.g., access terminals 308A and 308B) may be dispersed at various locations throughout the network at a given point in time. Each access terminal 308 may communicate with one or more access nodes 306 on a forward link (FL) and/or a reverse link (RL) at a given moment, depending upon whether the access terminal 308 is active and whether it is in soft handoff, for example.

The tracking areas 302 also include femto coverage areas 310. In this example, each of the femto coverage areas 310 (e.g., femto coverage area 310A-310C) is depicted within a macro coverage area 304 (e.g., macro coverage area 304B). It should be appreciated, however, that a femto coverage area 310 may not lie entirely within a macro coverage area 304. In practice, a large number of femto coverage areas 310 may be defined with a given tracking area 302 or macro coverage area 304. Also, one or more pico coverage areas (not shown) may be defined within a given tracking area 302 or macro coverage area 304. To reduce the complexity of FIG. 3, only a few access nodes 306, access terminals 308, and femto nodes are shown.

Figure 4:
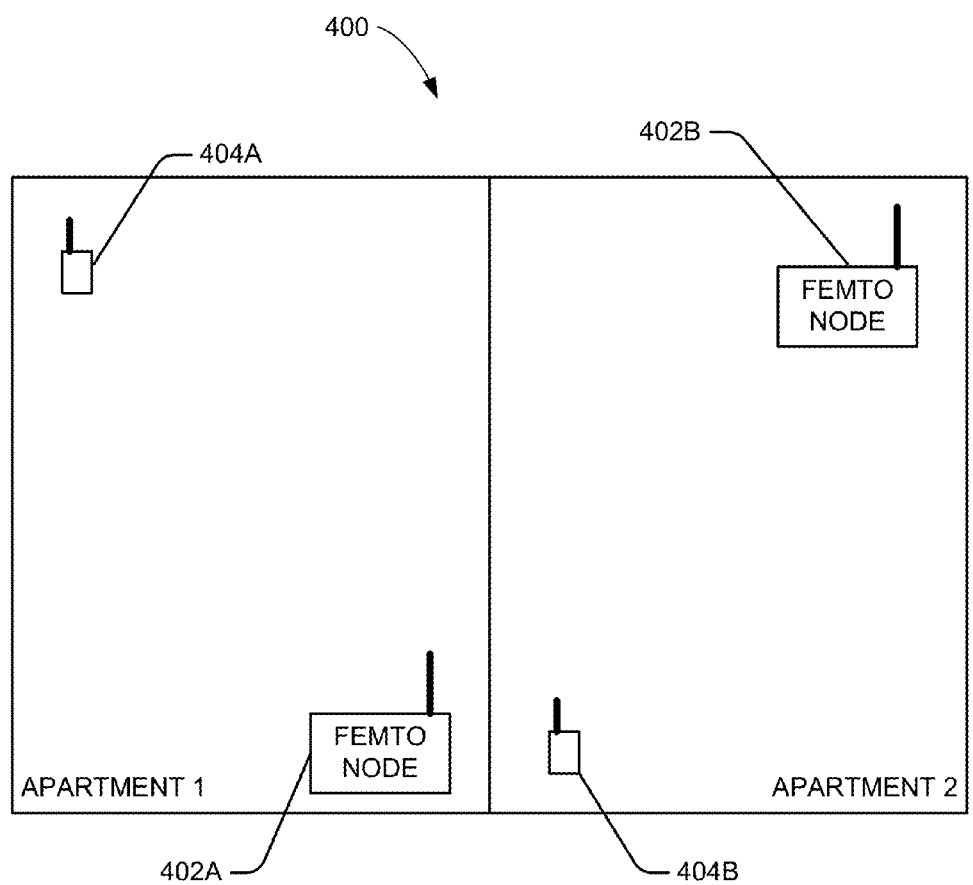
FIG. 4 is a simplified diagram of several sample aspects of a communication system including neighboring femto cells.

FIG. 4 illustrates a network 400 where femto nodes 402 are deployed in an apartment building. Specifically, a femto node 402A is deployed in apartment 1 and a femto node 402B is deployed in apartment 2 in this example. The femto node 402A is the home femto for an access terminal 404A. The femto node 402B is the home femto for an access terminal 404B.

As illustrated in FIG. 4, for the case where the femto nodes 402A and 402B are restricted, each access terminal 404 (e.g., 404A and 404B) may only be served by its associated (e.g., home) femto node 402. In some cases, however, restricted association may result in negative geometry situations and outages of femto nodes. For example, in FIG. 4 the femto node 402A is closer to the access terminal 404B than the femto node 402B and may therefore provide a stronger signal at the access terminal 404B. As a result, the femto node 402A may unduly interfere with reception at the access terminal 404B. Such a situation may thus affect the coverage radius around the femto node 402B at which an associated access terminal 404 may initially acquire the system and remain connected to the system.

Figure 5:
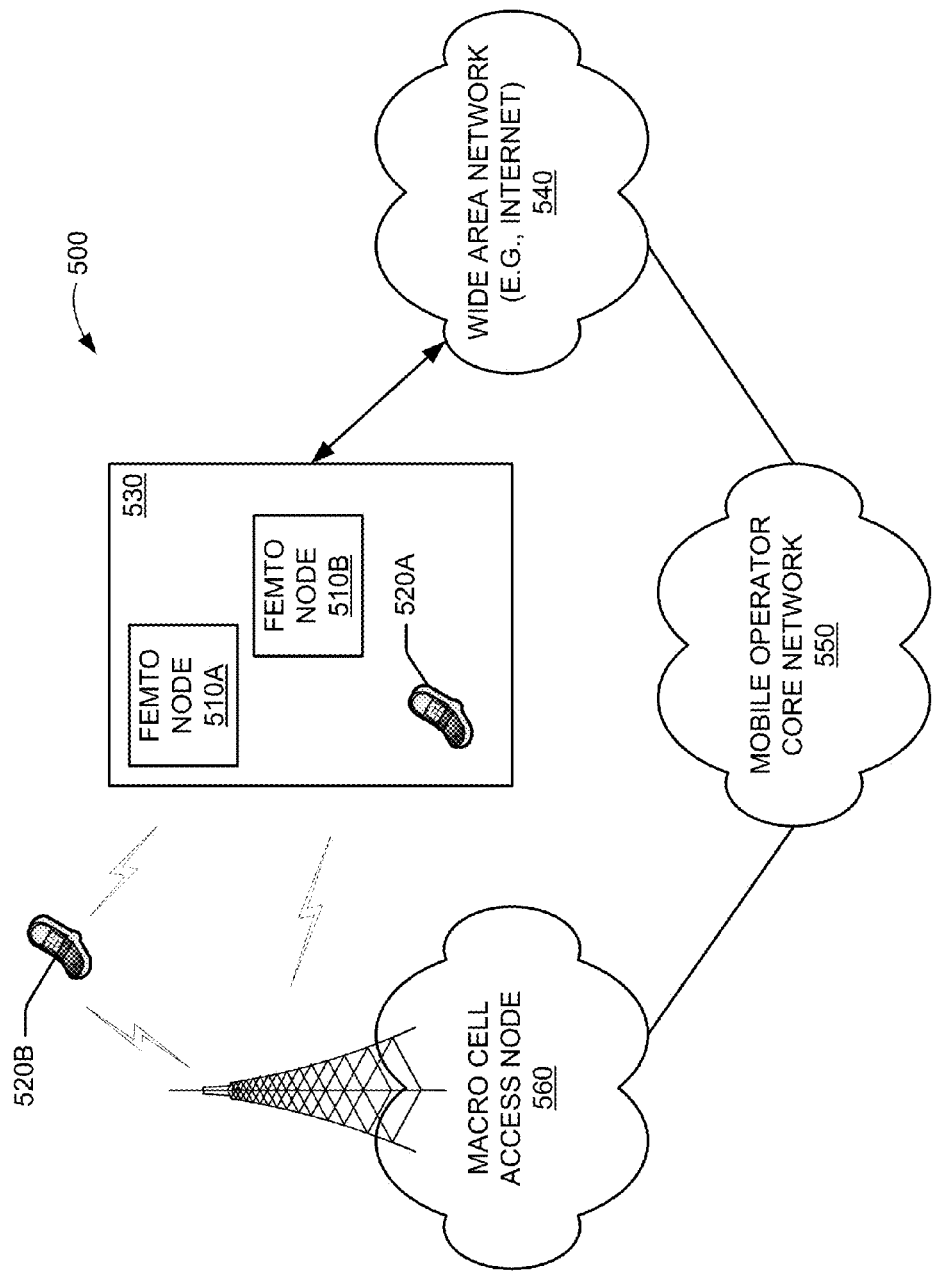
FIG. 5 is a simplified diagram of a wireless communication system including femto nodes.

FIG. 5 illustrates an exemplary communication system 500 where one or more femto nodes are deployed within a network environment. Connectivity for a femto node environment may be established in various ways within this communication system 500. Specifically, the system 500 includes multiple femto nodes 510 (e.g., femto nodes 510A and 510B)

installed in a relatively small scale network environment (e.g., in one or more user residences 530). Each femto node 510 may be coupled to a wide area network 540 (e.g., the Internet) and a mobile operator core network 550 via a DSL router, a cable modem, a wireless link, or other connectivity means (not shown). As discussed herein, each femto node 510 may be configured to serve associated access terminals 520 (e.g., access terminal 520A) and, optionally, other access terminals 520 (e.g., access terminal 520B). In other words, access to femto nodes 510 may be restricted whereby a given access terminal 520 may be served by a set of designated (e.g., home) femto nodes 510 but may not be served by any non-designated femto nodes 510 (e.g., a neighbor's femto node 510). Access terminals 520 also may be referred to herein as User Equipment 520 (UEs). Femto nodes 510 also may be referred to herein as Home NodeBs (HNBs).

The owner of a femto node 510 may subscribe to mobile service, such as, for example, 3G mobile service offered through the mobile operator core network 550. In addition, an access terminal 520 may be capable of operating both in macro environments and in smaller scale (e.g., residential) network environments. In other words, depending on the current location of the access terminal 520, the access terminal 520 may be served by an access node 560 of the macro cell mobile network 550 or by any one of a set of femto nodes 510 (e.g., the femto nodes 510A and 510B that reside within a corresponding user residence 530). For example, when a subscriber is outside his home, he may be served by a standard macro access node (e.g., node 560) and when the subscriber is at home, he is served by a femto node (e.g., node 510A). Here, it should be appreciated that a femto node 510 may be backward compatible with existing access terminals 520.

In embodiments described herein, the owner of the femto node 510 subscribes to mobile service, such as, for example, 3G mobile service, offered through the mobile operator core network 550, and the UE 520 is capable to operate both in macro cellular environment and in residential small scale network environment.

A home femto node is a base station on which an AT or UE is authorized to operate. A guest femto node refers to a base station on which an AT or UE is temporarily authorized to operate on, and an alien femto node is a base station on which the AT or UE is not authorized to operate.

A femto node 510 may be deployed on a single frequency or, in the alternative, on multiple frequencies. Depending on the particular configuration, the single frequency or one or more of the multiple frequencies may overlap with one or more frequencies used by a macro node (e.g., node 560).

An access terminal 520 may be configured to communicate either with the macro network 550 or the femto nodes 510, but not both simultaneously. In addition, an access terminal 520 being served by a femto node 510 may not be in a soft handover state with the macro network 550.

In some aspects, an access terminal 520 may be configured to connect to a preferred femto node (e.g., the home femto node of the access terminal 520) whenever such connectivity is possible. For example, whenever the access terminal 520 is within the user's residence 530, it may be desired that the access terminal 520 communicate only with the home femto node 510.

In some aspects, if the access terminal 520 operates within the macro cellular network 550 but is not residing on its most preferred network (e.g., as defined in a preferred roaming list), the access terminal 520 may continue to search for the most preferred network (e.g., the preferred femto node 510) using a Better System Reselection (BSR), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 may select the preferred femto node 510 for camping within its coverage area.

The teachings herein may be employed in a wireless multiple-access communication system that simultaneously supports communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple transmit antennas (NT) and multiple receive antennas (NR) for data communication. A MIMO channel formed by the NT transmit and NR receive antennas may be decomposed into multiple independent channels (NS), which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point. The teachings herein may be incorporated into a node (e.g., a device) employing various components for communicating with at least one other node.

Figure 6:
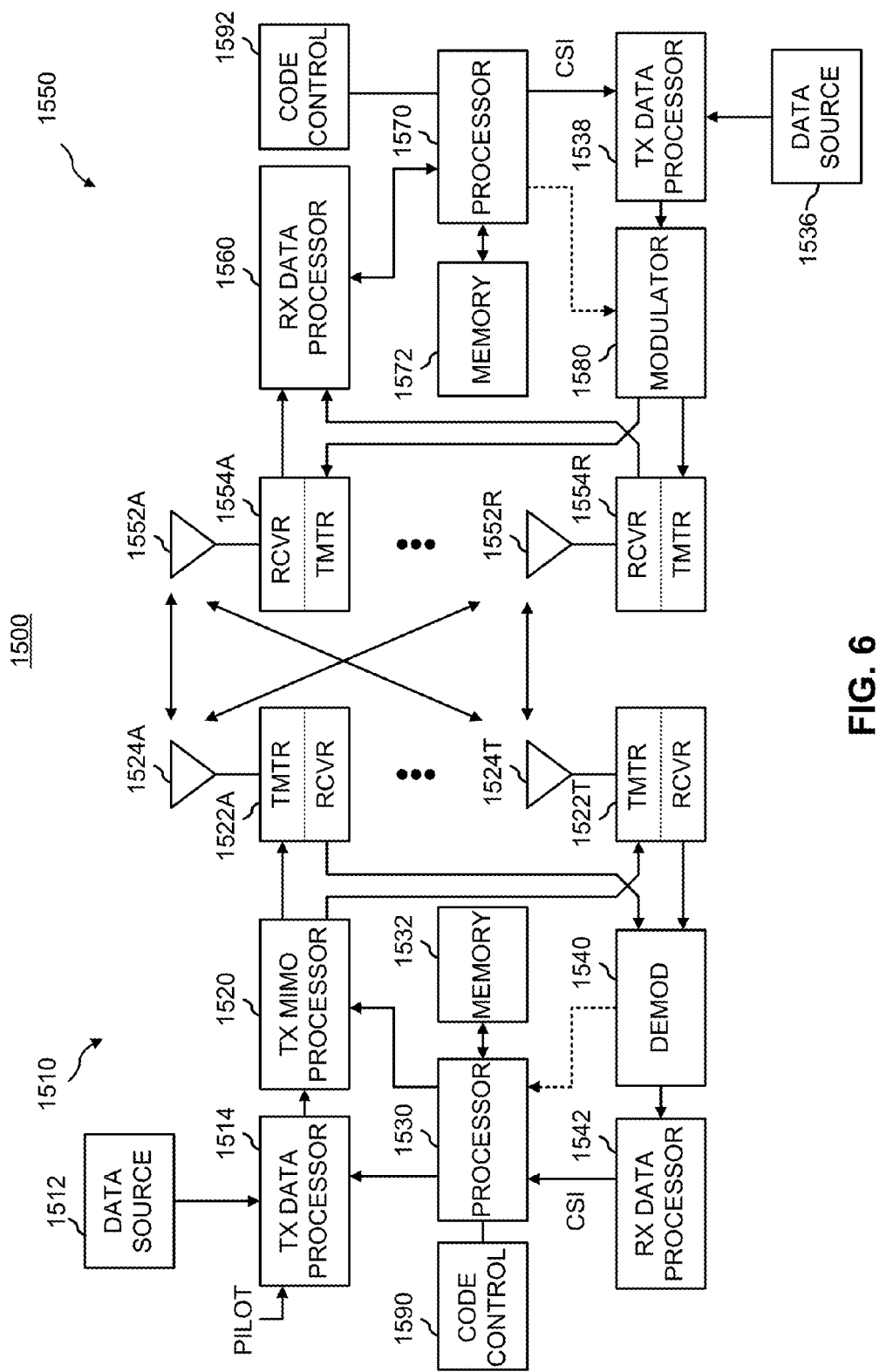
FIG. 6 depicts several sample components that may be employed to facilitate communication between nodes

FIG. 6 depicts several sample components that may be employed to facilitate communication between nodes. Specifically, FIG. 6 illustrates a wireless device 1510 (e.g., an access point) and a wireless device 1550 (e.g., an access terminal) of a MIMO system 1500. At the access point 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using Orthogonal Frequency-Division Multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme selected for that data stream to provide modulation symbols. As non-limiting examples, some suitable modulation schemes are: Binary Phase-Shift Keying (BPSK), Quadrature Phase-Shift Keying (QSPK), Multiple Phase-Shift Keying (M-PSK), and Multi-level Quadrature amplitude modulation (M-QAM).

The data rate, coding, and modulation for each data stream may be determined by instructions performed by a processor 1530. A data memory 1532 may store program code, data, and other information used by the processor 1530 or other components of the access point 1510.

The modulation symbols for all data streams are then provided to a TX MIMO processor 1520, which may further process the modulation symbols (e.g., for OFDM). The TX MIMO processor 1520 then provides NT modulation symbol streams to NT transceivers (XCVR) 1522 (e.g., 1522A through 1522T). In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1522A through 1522T are then transmitted from corresponding NT antennas 1524 (e.g., 1524A through 1524T).

At the access terminal 1550, the transmitted modulated signals are received by NR antennas 1552 (e.g., 1552A through 1552R) and the received signal from each antenna 1552 is provided to a respective transceiver 1524 (e.g., 1554A through 1554R). Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the NR received symbol streams from NR transceivers 1554 based on a particular receiver processing technique to provide NT "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the access point 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the access terminal 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted through the respective antennas 1522A through 1552R back to the access point 1510.

At the access point 1510, the modulated signals from the access terminal 1550 are received by the antennas 1524, conditioned by the transceivers 1522, demodulated by a demodulator (DEMOD) 1540, and processed by a RX data processor 1542 to extract the reverse link message transmitted by the access terminal 1550. The processor 1530 then determines which pre-coding matrix to use for determining the beam-forming weights then processes the extracted message.

FIG. 6 also illustrates that the communication components may include one or more components that perform transmit power control operations as taught herein. For example, a code control component 1590 may cooperate with the processor 1530 and/or other components of the access point 1510 to send/receive signals to/from another device (e.g., access terminal 1550) as taught herein. Similarly, a code control component 1592 may cooperate with the processor 1570 and/or other components of the access terminal 1550 to send/receive signals to/from another device (e.g., access point 1510). It should be appreciated that for each wireless device 1510 and 1550 the functionality of two or more of the described components may be provided by a single component. For example, a single processing component may provide the functionality of the code control component 1590 and the processor 1530 and a single processing component may provide the functionality of the code control component 1592 and the processor 1570.

An access terminal as discussed herein may be referred to as a mobile station, user equipment, subscriber unit, subscriber station, remote station, remote terminal, user terminal, user agent, or user device. In some implementations such a node may consist of, be implemented within, or include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link. Accordingly, the access node may enable another node (e.g., an access terminal) to access the network or some other functionality. In addition, it should be appreciated that one or both of the nodes may be portable or, in some cases, relatively non-portable. Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

In general, cellular systems operate on multiple carriers (i.e., carrier frequencies). Thus, a system may be deployed with a certain number of carriers and carriers may be increased as bandwidth demands increase. If there is only one available carrier for all femto cells, there would be a certain amount of inter-femto interference. One solution to this problem would be to implement multiple carrier operation for femtocells. For example, neighboring femtocells in an apartment building can be assigned to different frequency carriers to mitigate the interference problems.

Thus, in embodiments of the present invention, HNBs may include the ability to communicate on more than one carrier. In addition, professional installation is often not practical for the installation of HNBs. As a result, there is a need for femto nodes to be able to autonomously select the carrier that it will use in a system with multiple available carriers.

Embodiments of the present invention provide apparatuses and method to autonomously select a carrier frequency on which to operate. In a multi-carrier system, the system operator may define specific carriers dedicated to femto nodes, specific carriers dedicated to macro nodes, and specific carriers to be shared between femto and macro nodes. Some systems may not dedicate certain carriers and all the carriers may be shared between femto nodes and macro nodes. For the most part the identification and selection process for femto carriers is concerned with downlink carrier frequencies. However, in some embodiments the selection process may include uplink carrier frequencies. Uplink carrier frequencies are identified with an "uplink" modifier. If a carrier is not designated as an uplink carrier or a downlink carrier, it should be considered a downlink carrier.

As a mathematical definition, if an operator has N carrier frequencies: $F=\{f_1, f_2, \ldots, f_N\}$ (on UL and DL), then femtocells can use a certain subset ($F_{femto}$) of these frequencies, while macrocells can use a certain subset ($F_{macro}$). In the following embodiments, we assume $F_{femto}=\{f_1, f_2, \ldots, f_K\}$ and $F_{macrocell}=\{f_M, f_{M+1}, \ldots, f_N\}$, where $1 \leq K \leq N$ and $1 \leq M \leq N$. This notation makes the description easier without loss of generality. Thus, if K=1 then femto cells can only use one carrier and if K=N then femto cells can use all carriers in the set of all downlink carriers. Similarly, if M=1 then macro cells can use all the available carriers and if M=N then macro cells can use only one available carriers (i.e., carrier N). Of course, with some definitions for K and M, there may be carriers dedicated to femto cells, carriers dedicated to macro cells, and carriers dedicated to be shared.

If macrocells operate on the same carrier as femtocells then femto-macro interference may result in a certain amount of outage and performance degradation both for femto UEs and macro UEs. One solution for the femto-macro interference would be to make sure the carriers used by femtocells are not used by macrocells. Although this method reduces femto-macro interference noticeably, it may not to be efficient in terms of spectrum utilization, especially during earlier deployments. Also, the total available number of carriers for an operator needs to be considered for this decision. For most operators with limited carriers (e.g., two or three carriers per air interface technology), it is advised that the carriers be shared between femtocells and macrocells. Then, if a macrocell UE goes into the coverage hole of a femtocell, it could perform inter-frequency handoff to another carrier frequency. In one embodiment, macrocell legacy UEs are designed to choose the best macrocell frequency to operate given that system parameters are chosen appropriately. In order to minimize the number of inter-frequency handover events for macrocell UEs, femtocells may prefer a certain frequency and use other frequencies only in the homes where there is a noticeable interference from neighboring femtocell homes.

Figure 7:
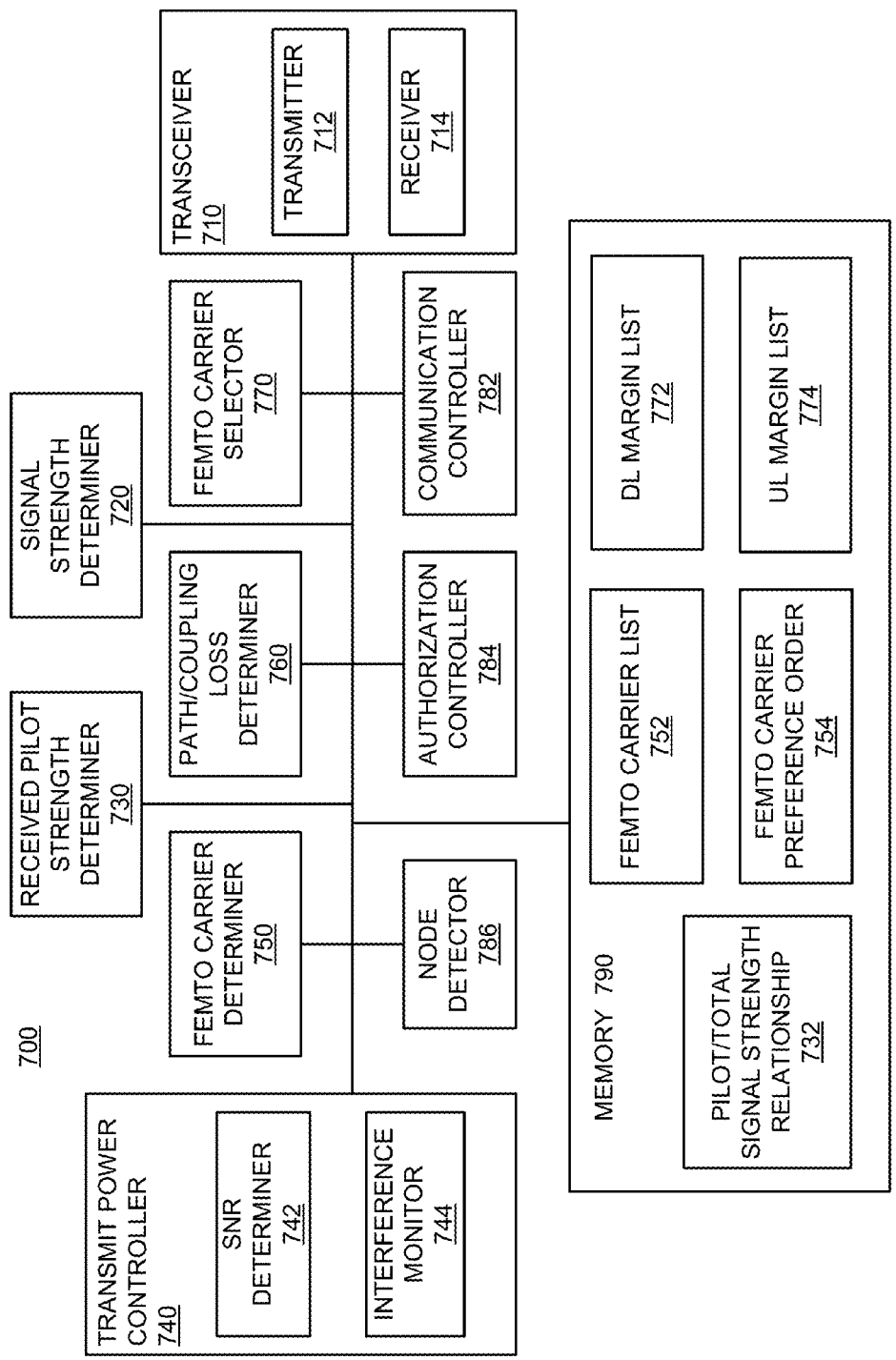
FIG. 7 is a simplified block diagram of several sample aspects of a femto node supporting autonomous carrier selection in femto nodes.

FIG. 7 illustrates various components of an access node 700 (also referred to herein as a femto node 700) that may be used in one or more implementations as taught herein. It should thus be appreciated that in some implementations a femto node 700 may not incorporate all of the components depicted in FIG. 7 while in other implementations a femto node 700 may employ most or all of the components depicted in FIG. 7.

Briefly, the femto node 700 includes a transceiver 710 for communicating with other nodes (e.g., access terminals). The transceiver 710 includes a transmitter 712 for sending signals and a receiver 714 for receiving signals.

The femto node 700 may also include a transmit power controller 740 for determining transmit power for the transmitter 712 as well as other neighboring femto nodes (not shown) and macro nodes 560 (FIG. 5). The femto node 700 includes a communication controller 782 for managing communications with other nodes and for providing other related functionality as taught herein. The femto node 700 also may include an authorization controller 784 for managing access to other nodes and for providing other related functionality as taught herein. A node detector 786 may determine whether a particular type of node is in a given coverage area.

The transmit power controller 740 may include an interference monitor 744 for monitoring and determining interference that the femto node 700 may cause on a macrocell or other neighboring femto cells for a given set of downlink carriers. The interference may be based on the total received signal strength (RSS), the received pilot strength, or a combination thereof. The transmit power controller 740 also may include a Signal to Noise Ratio (SNR) determiner 742 for determining SNR values associated with the femto node 700.

A signal strength determiner 720 may determine a RSS value for multiple carriers in a set of downlink carriers available to the femto node 700. A received pilot strength determiner 730 may determine a signal strength value associated with a pilot signal for each of the carriers. A path/coupling loss determiner 760 may determine coupling loss between a HUE and a macrocell in various ways, as are described more fully below.

A femto carrier determiner 750 may determine what carrier signals are available to the femto node 700 and define a preference order for those carriers. A femto carrier selector 770 may operate in cooperation with the signal strength determiner 720, the received pilot strength determiner 730, and the interference monitor 744 to select an appropriate carrier on which the femto node 700 should operate.

The memory 790 may store many parameters useful in conjunction with operation of some of the functional elements. As non-limiting examples, the memory 790 may include a pilot/total signal strength relationship 732 corresponding to a known or estimated relationship between the pilot strength and the total strength determined by the signal strength determiner 720 and the received pilot strength determiner 730. A femto carrier list 752 may include a list of carriers (both DL and corresponding UL) that are available for the femto node 700. A femto carrier preference order 754 may define an order of preference for the set of downlink carriers available to the femto node 700. A DL margin list 772 may include margins useful in selecting an appropriate DL carrier and a UL margin list 774 may include margins useful in selecting an appropriate UL carrier.

Figure 8:
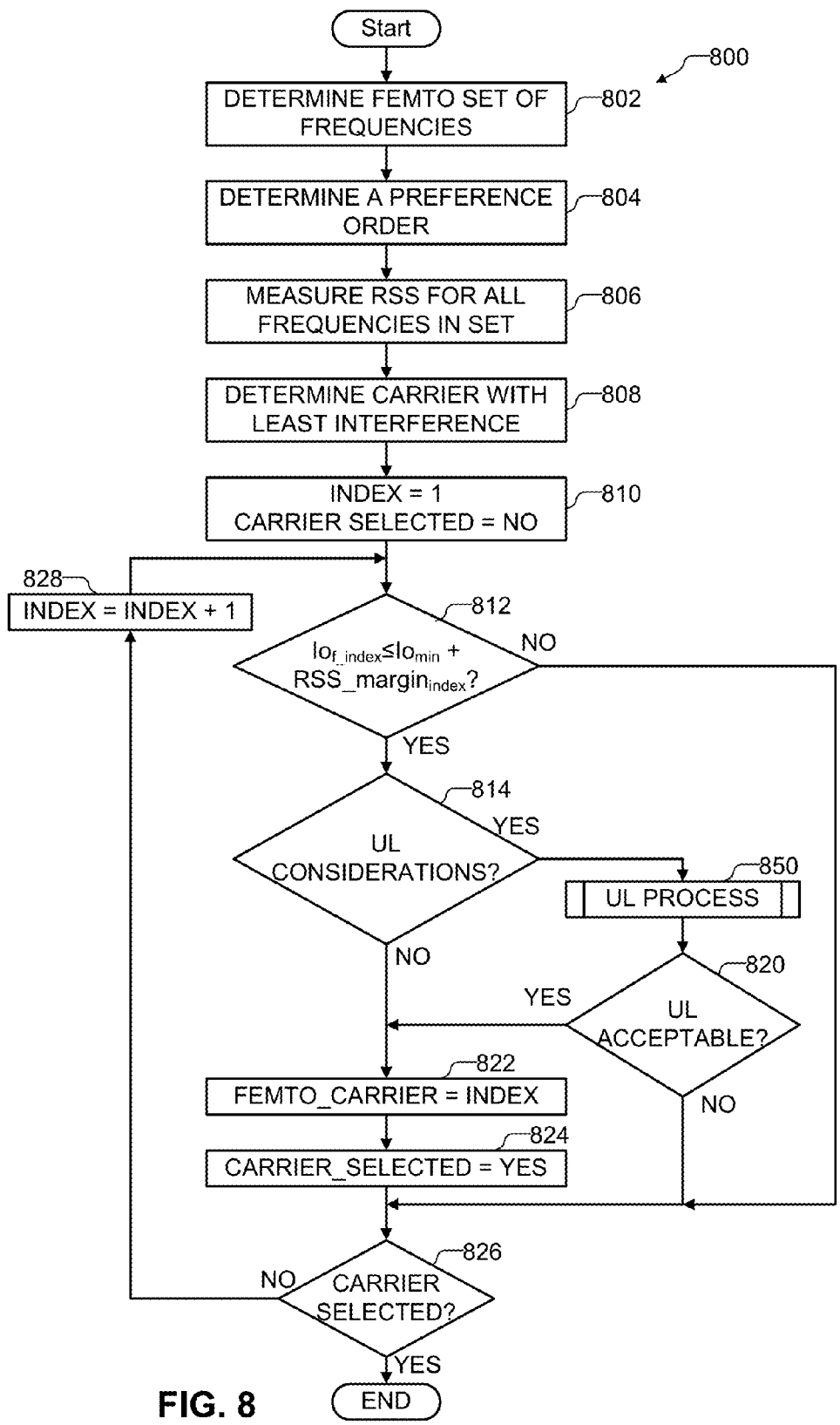
FIG. 8 is a simplified flow diagram of a process for autonomously selecting a carrier for a femto node.

FIG. 8 is a simplified flow diagram of a process 800 for autonomously selecting a carrier for a femto node. FIGS. 5, 7, and 8 will be referred to in describing the autonomouus carrier selection process 800.

In operation block 802, the femto carrier determiner 750 determines the set of downlink carriers that are available to the femto node and may store the set in the femto carrier list 752 of the memory 790. The set may be predefined when the femto node 700 is shipped, or the femto node may download the femto carrier list 752 across the wide area network 540 (e.g., via backhaul in a DSL configuration). Furthermore, if desired, the femto carrier list 752 may be periodically updated across the wide area network 540.

In operation block 804, the femto carrier determiner 750 determine a preference order for the femto carrier list 752 and may store it in the memory as the femto carrier preference order 754. As with the femto carrier list 752, the femto carrier preference order 754 may be redefined, downloaded over the wide area network 540 and updated over the wide area network 540 (e.g., via backhaul in a DSL configuration). With this preference order, the carriers may be ranked from a most preferred to a least preferred carrier. Thus, femto nodes 700 may be concentrated on a most preferred carrier and only if there is too much interference on the most preferred carrier will a femto node 700 attempt to select the next most preferred carrier, and so on down to the least preferred carrier. This process concentrates as many femto nodes on the most preferred carrier, absent unacceptable interference, so that the femto carriers are used efficiently.

In operation block 806, the signal strength determiner 720 measures a RSS measurement (Io) for each carrier frequency in the femto carrier list 752, which includes:

$$F_{femto} = \{f_1, f_2, \ldots, f_K\} \text{ as } Io_{f\_1}, Io_{f\_2}, \ldots, Io_{f\_K} \text{ (in dBm units)}.$$

In operation block 808, the interference monitor 744 finds a least interference carrier as:

$$Io_{min} = \min[Io_{f\_1}, Io_{f\_2}, \ldots, Io_{f\_K}]$$

Operation block 810 indicates that the femto node 700 defines a loop index and sets its initial value to 1 and defines a carrier selected variable and sets its initial value to "no."

Decision block 812 indicates that the femto carrier selector 770 compares the $Io_{f\_index}$ (i.e. the $Io_f$ of the current carrier for this index value of the loop) to the $Io_{min}$ offset by a value RSS_margin$_{index}$. Or, written as an equation:

$$Io_{f\_index} \leq (Io_{min} + \text{Femto\_Frequency\_RSS\_margin}_{index}) \quad \text{Equation 1}$$

The parameter Femto_Frequency_RSS_margin$_{index} \geq 0$ dB, in the above algorithm, is a predefined margin used to adjust a tradeoff between the desire to select the least interference carrier versus the desire to concentrate femtocells on preferred carriers so that coverage holes created for macrocell users are minimized.

Thus, as Femto_Frequency_RSS_margin approaches 0 dB, the femtocell will pick the carrier with the least amount of interference because only the least interference carrier will evaluate equation 1 to true.

Conversely, as Femto_Frequency_RSS_margin approaches ∞ dB, the femtocell will always pick the most preferred carrier (i.e., f1) because the first carrier evaluated in the loop (i.e., f1) will evaluate equation 1 to true.

In some embodiments, there may be a different RSS_margin for each carrier (as is indicated by the "index" subscript) and stored in the memory 790 as the DL margin list 772. In other embodiments, a single RSS_margin may be defined for all the carrier frequencies.

If decision block 812 evaluates false, the carrier for the current index value is not selected and control transfers to decision block 826. Since a carrier was not selected, decision block 826 evaluates false, operation block 828 increments the index, and the loop is started again with the next most preferred carrier.

If decision block 812 evaluates true, some embodiments may include a process to consider interference of an uplink carrier associated with the current downlink carrier. Other embodiments may not consider interference of uplink carriers. If uplink considerations are to be evaluated (as indicated by decision block 814) an uplink process 850 will be performed. The uplink process 850 is discussed below with reference to FIG. 9. If the uplink process 850 indicates that the uplink carrier is not acceptable, control transfers to decision block 826 with no carrier selected so the loop repeats for the next index and the next carrier associated with that index.

For embodiments that don't consider the uplink carrier, and embodiments that consider the uplink carrier and find that it is acceptable, operation block 822 indicates that the femto carrier selector 770 selects the current carrier as the selected carrier to use as the downlink carrier.

Operation block 824 indicates that a carrier has been selected. With a carrier selected, decision block 826 evaluates true and the carrier selection process 800 terminates.

Of course, those of ordinary skill in the art will recognize that the carrier selection process may be repeated periodically, or at some other selected time. When repeated, some of the processes may not need to be repeated. As non-limiting examples, there may be no need to define a new femto carrier list 752 or a femto carrier preference order 754. In addition, in embodiments related to 3GPP2 deployments, the above method may be applied independently to 1xRTT carriers and 1xEV-DO carriers.

As a non-limiting example of the operation of the carrier selection process 800, assume that the operator has eight total carriers and four carriers are selected for inclusion in the set of downlink carriers available to the femto node. Then assume that the preferred order for those four carriers is carrier 2, carrier 1, carrier 3, and carrier 4. The process measures the RSS for each of the carriers and determines that carrier 3 has the minimum Io, which is −80 dBm. Also assume that a single RSS_margin is defined for all the carriers at 15 dBm.

The first time through the loop, carrier 2 has an Io of −70 dBm, so equation 1 will evaluate false. The next time through the loop, carrier 1 has an Io of −60 dBm, so equation 1 will evaluate true and carrier 1 will be the selected carrier.

Thus, even though carrier 2 was the most preferred, it was not selected because there was too much interference on carrier 2. In addition, even though carrier 3 had the lowest interference, it was not selected because carrier 1 is preferred over carrier 3.

As other non-limiting example, as mentioned above, the set of available frequencies for femtocells and macrocells are $F_{femto} = \{f_1, f_2, \ldots, f_K\}$ and $F_{macrocell} = \{f_M, f_{M+1}, \ldots, f_N\}$, respectively, where $1 \leq K \leq N$ and $1 \leq M \leq N$. Another choice is the value of parameters K and M, which defines the number of available frequencies for femtocells and macrocells. In these examples, the focus will be on simple deployment cases for N=1, 2, and 3 and the preferred choice for these parameters.

Assume that N=1 so the operator has a single carrier $\{f_1\}$ available. In this case, K=M=1 and all femtocells and macrocells use the same carrier. There is, therefore, no need to perform process 800.

Assume that N=2 so the operator has two carriers: $\{f_1, f_2\}$ available. In this case, assume K=2 and M=1. Thus, femtocells can use $f_1$ and $f_2$ and macrocells can use $f_1, f_2$. As a result inter-femto interference may be minimized. By proper choice of Femto_Frequency_RSS_margin, most femtocells may be forced to use carrier f1 so that the high mobility macrocell UEs in active calls mostly use f2 and may not experience frequent coverage holes by femtocells.

Assume that N=3, so the operator has three carriers: {f1, f2, f3} available. In this case, assume K=2 and M=1. Thus, femtocells use {$f_1$, $f_2$} while macrocells use {$f_1$, $f_2$, $f_3$}. As a result, inter-femto interference may be minimized. Furthermore, this choice keeps $f_3$ as a reserved carrier for macrocells, so that high mobility macrocell UEs end up using $f_3$ and do not experience frequent coverage holes by femtocells. Thus, the parameter Femto_Frequency_RSS_margin can be smaller than the N=2 case, which may allow for better inter-femto interference management.

Figure 9:
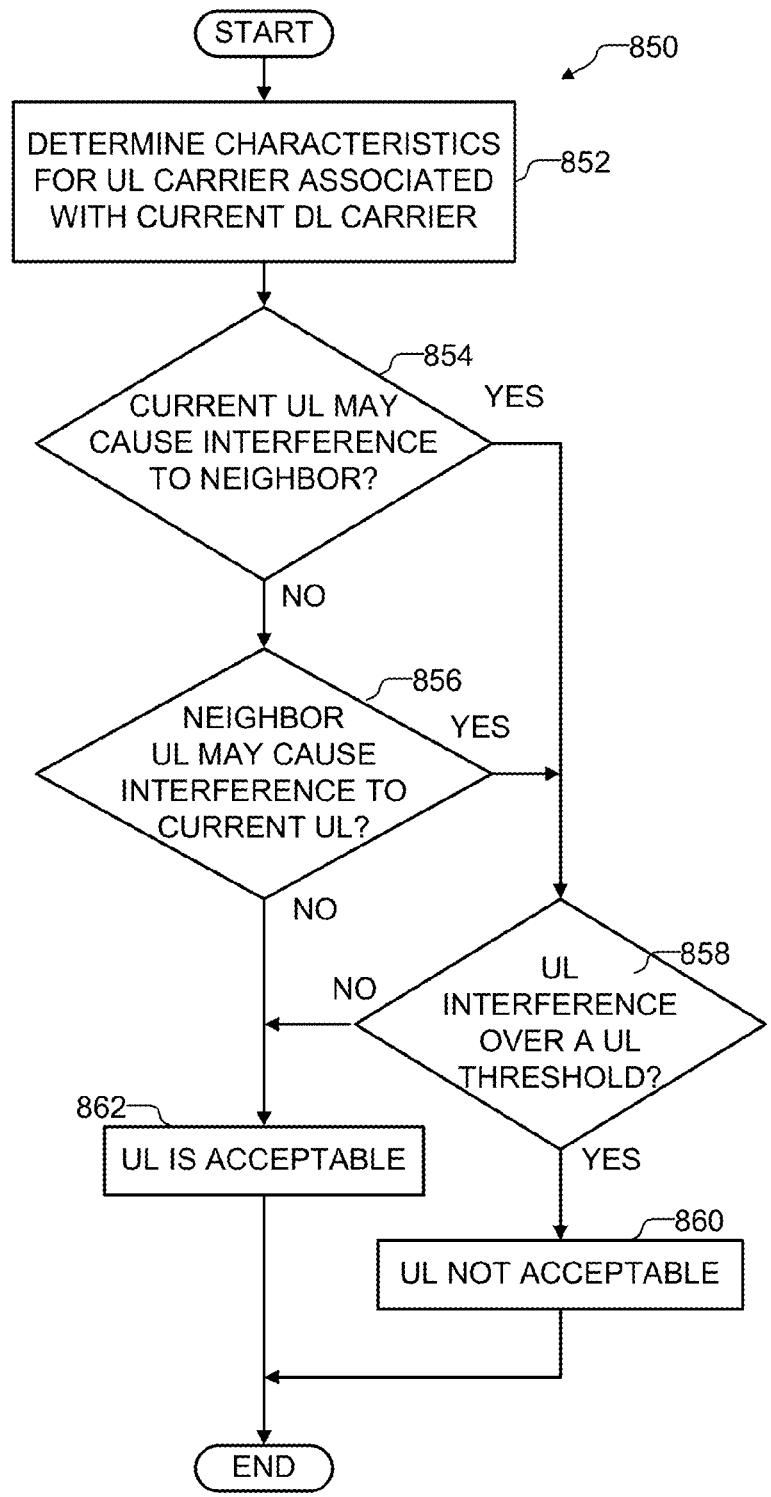
FIG. 9 is a simplified flow diagram of a process for evaluating characteristics of an uplink carriers associated with a downlink carrier.

FIG. 9 is a simplified flow diagram of a process 850 for evaluating characteristics of an uplink carriers associated with a downlink carrier. In some embodiments, an uplink carrier associated with the current downlink carrier being evaluated in process 800 (FIG. 8) may also be evaluated. FIGS. 5, 7, 8, and 9 will be referred to in describing process 850.

Operation block 852 indicates that the signal strength determiner 720 determines signal characteristics for the uplink carrier associated with the currently evaluated downlink carrier. The signal strength determiner may operate in cooperation with the path/coupling loss determiner 760, the received pilot strength determiner 730, and the interference monitor 744 to determine the uplink carrier characteristics.

As a non-limiting example, by determining a path loss from the femto node to a neighboring femto node or a nearby macro node, the femto node can determine that it is causing interference to a neighbor femto node. Alternatively, by determining the RSS of the uplink frequency, the femto node can determine that there is interference from a neighbor femto node on the current femto node.

Decision block 854 indicates that the interference monitor determines that for the current uplink carrier femto node is causing interference to a neighbor femto node. If so, control transfers to decision block 858. If not, control transfers to decision block 856.

Decision block 856 indicates that the interference monitor determines that for the current uplink carrier there is interference from a neighbor femto node on the current femto node. If so, control transfers to decision block 858. If not, control transfers to operation block 862.

In operation block 862, the uplink carrier is identified as acceptable and the process terminates.

In decision block 858, the interference for the current uplink carrier is compared to an uplink threshold (also referred to herein as an uplink margin). If the interference is greater than the uplink margin, the operation block 860 indicates that the uplink carrier is identified as not acceptable and the process terminates. If the interference is less than or equal to the uplink margin, the operation block 862 indicates that the uplink carrier is identified as acceptable and the process terminates.

As with the downlink margin, the uplink margin may be a single value or may be a set of values with each value corresponding to an uplink carrier frequency and stored in the memory 790 as the UL margin list 774.

Figure 10:
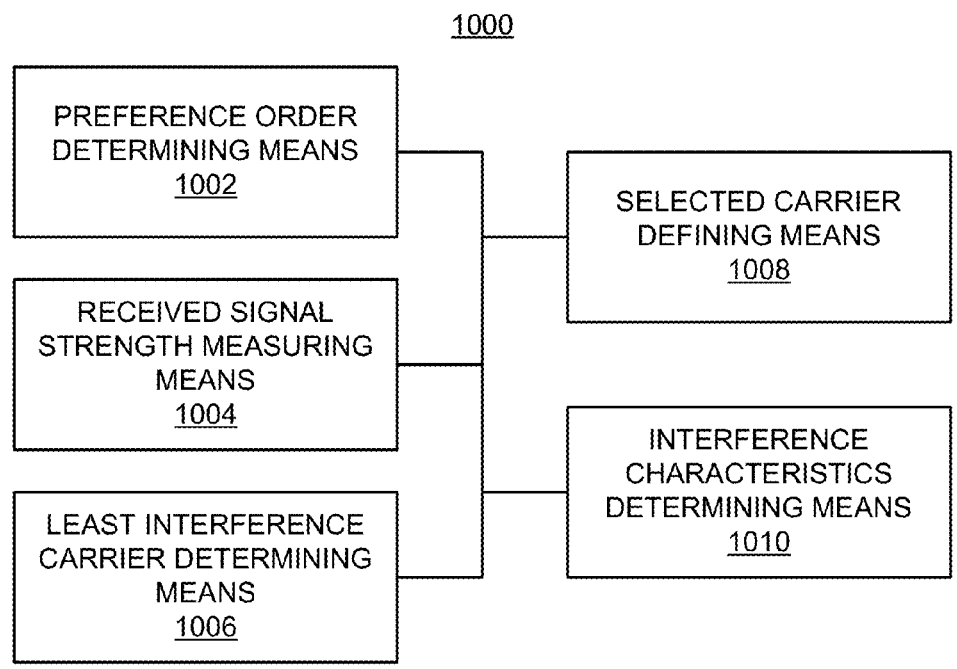
FIG. 10 is a simplified block diagram of several sample aspects of apparatuses configured for autonomously selecting a carrier for a femto node as taught herein.

The components described herein may be implemented in a variety of ways. Referring to FIG. 10, apparatus 1000 is represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatus 1000 may include one or more modules that may perform one or more of the functions described above with regard to various figures. For example, a preference order determining means 1002 may correspond to, for example, a femto carrier determiner as discussed herein. A received signal strength measuring means 1004 may correspond to, for example, a signal strength determiner as discussed herein. A least interference carrier determining means 1006 may correspond to, for example, a femto carrier selector as discussed herein. A selected carrier defining means 1008 may correspond to, for example, a femto carrier selector as discussed herein. An interference characteristics determining means 1010 may correspond to, for example, a signal strength determiner as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of carrier selection for a femto node, comprising:
   determining a preference order for a set of downlink carriers available to the femto node;
   measuring a received signal strength for each carrier of the set of downlink carriers;
   determining a least interference carrier from the set of downlink carriers responsive to the received signal strength for each carrier of the set of downlink carriers; and
   defining a selected carrier for the femto node from the set of downlink carriers responsive to a comparison of the received signal strength of the least interference carrier offset by a predefined margin to the received signal strength of at least one carrier of the set of downlink carriers, wherein the predefined margin is used to adjust a tradeoff between selecting the least interference carrier and concentrating the femto node on preferred carriers.

2. The method of claim 1, wherein the set of downlink carriers available to femto nodes is a subset of a set of all downlink carriers available to a combination of femto nodes and macro nodes.

3. The method of claim 2, wherein at least one of the set of downlink carriers available to the femto nodes is also a carrier available to the macro nodes.

4. The method of claim 1, further comprising repeating at least one of the acts of determining the preference order, measuring the received signal strength, determining the least interference carrier, and defining the selected carrier for the femto node.

5. The method of claim 1, wherein defining the selected carrier for the femto node further comprises:
   comparing the received signal strength for a current carrier of the set of downlink carriers to the received signal strength of the least interference carrier offset by the predefined margin;
   selecting the current carrier if the received signal strength of the current carrier is less than or equal to the received signal strength of the least interference carrier offset by the predefined margin; and
   repeating the comparing and selecting for a next carrier of the set of downlink carriers if the received signal strength of the current carrier is greater than the received signal strength of the least interference carrier offset by the predefined margin.

6. The method of claim 5, wherein the acts of comparing the received signal strength for the current carrier, selecting the current carrier, and repeating the comparing and selecting for the next carrier are performed in the preference order for the set of downlink carriers from a most preferred to a least preferred.

7. The method of claim 5, wherein a different predefined margin is defined for each carrier in the set of downlink carriers.

8. The method of claim 5, further comprising determining interference characteristics of a set of uplink carriers, wherein a current uplink carrier is associated with the current carrier and wherein:
   selecting the current carrier further comprises:
      determining an interference to a neighbor if the interference characteristics for the current uplink carrier indicate that the current uplink carrier will interfere with an uplink carrier of a neighboring femto node; and
      selecting the current carrier if the interference to the neighbor is less than an uplink threshold; and
   repeating the comparing and selecting for the next carrier further comprises performing the repeating if the interference to the neighbor is equal to or greater than the uplink threshold.

9. The method of claim 5, further comprising determining interference characteristics of a set of uplink carriers, wherein a current uplink carrier is associated with the current carrier and wherein:
  selecting the current carrier further comprises:
    determining an interference from a neighbor if the interference characteristics for an uplink carrier of a neighboring femto node will interfere with the current uplink carrier; and
    selecting the current carrier if the interference from the neighbor is less than an uplink threshold; and
  repeating the comparing and selecting for the next carrier further comprises performing the repeating if the interference from the neighbor is equal to or greater than the uplink threshold.

10. A femto node, comprising:
  a femto carrier determiner for identifying a set of downlink carriers available to the femto node and determining a preference order for the set of downlink carriers;
  a signal strength determiner for measuring a received signal strength for each carrier of the set of downlink carriers;
  an interference monitor for identifying a least interference carrier from the set of downlink carriers responsive to the received signal strength for each carrier of the set of downlink carriers; and
  a femto carrier selector for defining a selected carrier for the femto node from the set of downlink carriers responsive to a comparison of the received signal strength of the least interference carrier offset by a predefined margin to the received signal strength of at least one carrier of the set of downlink carriers, wherein the predefined margin is used to adjust a tradeoff between selecting the least interference carrier and concentrating the femto node on preferred carriers.

11. The femto node of claim 10, wherein the femto carrier selector is further for:
  comparing the received signal strength for a current carrier of the set of downlink carriers to the received signal strength of the least interference carrier offset by the predefined margin;
  selecting the current carrier if the received signal strength of the current carrier is less than or equal to the received signal strength of the least interference carrier offset by the predefined margin; and
  repeating the comparing and selecting for a next carrier of the set of downlink carriers if the received signal strength of the current carrier is greater than the received signal strength of the least interference carrier offset by the predefined margin.

12. The femto node of claim 11, wherein the femto carrier selector is further for comparing the received signal strength for the current carrier, selecting the current carrier, and repeating the comparing and selecting for the next carrier in the preference order for the set of downlink carriers from a most preferred to a least preferred.

13. The femto node of claim 11, wherein a different predefined margin is defined for each carrier in the set of downlink carriers.

14. The femto node of claim 11, wherein:
  the interference monitor is further for determining interference characteristics of a set of uplink carriers, wherein a current uplink carrier is associated with the current carrier; and
  the femto carrier selector is further for:
    determining an interference to a neighbor if the interference characteristics for the current uplink carrier indicate that the current uplink carrier will interfere with an uplink carrier of a neighboring femto node; and
    selecting the current carrier if the interference to the neighbor is less than an uplink threshold; and
  repeating the comparing and selecting for the next carrier further comprises performing the repeating if the interference to the neighbor is equal to or greater than the uplink threshold.

15. The femto node of claim 11, wherein:
  the interference monitor is further for determining interference characteristics of a set of uplink carriers, wherein a current uplink carrier is associated with the current carrier; and
  the femto carrier selector is further for:
    determining an interference from a neighbor if the interference characteristics for an uplink carrier of a neighboring femto node will interfere with the current uplink carrier; and
    selecting the current carrier if the interference from the neighbor is less than an uplink threshold; and
  repeating the comparing and selecting for the next carrier further comprises performing the repeating if the interference from the neighbor is equal to or greater than the uplink threshold.

16. A femto node, comprising:
  a memory; and
  a processor operably coupled to the memory and configured for:
  determining a preference order for a set of downlink carriers available to the femto node;
  measuring a received signal strength for each carrier of the set of downlink carriers;
  determining a least interference carrier from the set of downlink carriers responsive to the received signal strength for each carrier of the set of downlink carriers; and
  defining a selected carrier for the femto node from the set of downlink carriers responsive to a comparison of the received signal strength of the least interference carrier offset by a predefined margin to the received signal strength of at least one carrier of the set of downlink carriers, wherein the predefined margin is used to adjust a tradeoff between selecting the least interference carrier and concentrating the femto node on preferred carriers.

17. The femto node of claim 16, wherein defining the selected carrier for the femto node further comprises:
  comparing the received signal strength for a current carrier of the set of downlink carriers to the received signal strength of the least interference carrier offset by the predefined margin;
  selecting the current carrier if the received signal strength of the current carrier is less than or equal to the received signal strength of the least interference carrier offset by the predefined margin; and
  repeating the comparing and selecting for a next carrier of the set of downlink carriers if the received signal strength of the current carrier is greater than the received signal strength of the least interference carrier offset by the predefined margin.

18. A femto node, comprising:
  means for determining a preference order for a set of downlink carriers available to the femto node;
  means for measuring a received signal strength for each carrier of the set of downlink carriers;

means for determining a least interference carrier from the set of downlink carriers responsive to the received signal strength for each carrier of the set of downlink carriers; and means for defining a selected carrier for the femto node from the set of downlink carriers responsive to a comparison of the received signal strength of the least interference carrier offset by a predefined margin to the received signal strength of at least one carrier of the set of downlink carriers, wherein the predefined margin is used to adjust a tradeoff between selecting the least interference carrier and concentrating the femto node on preferred carriers.

19. The femto node of claim 18, wherein the set of downlink carriers available to femto nodes is a subset of a set of all downlink carriers available to a combination of femto nodes and macro nodes.

20. The femto node of claim 19, wherein at least one of the set of downlink carriers available to the femto nodes is also a carrier available to the macro nodes.

21. The femto node of claim 18, wherein the means for defining the selected carrier for the femto node further comprises:
　　means for comparing the received signal strength for a current carrier of the set of downlink carriers to the received signal strength of the least interference carrier offset by the predefined margin;
　　means for selecting the current carrier if the received signal strength of the current carrier is less than or equal to the received signal strength of the least interference carrier offset by the predefined margin; and
　　means for repeating the comparing and selecting for a next carrier of the set of downlink carriers if the received signal strength of the current carrier is greater than the received signal strength of the least interference carrier offset by the predefined margin.

22. The femto node of claim 21, wherein a different predefined margin is defined for each carrier in the set of downlink carriers.

23. The femto node of claim 21, further comprising means for determining interference characteristics of a set of uplink carriers, wherein a current uplink carrier is associated with the current carrier and wherein:
　　the means for selecting the current carrier further comprises:
　　　　means for determining an interference to a neighbor if the interference characteristics for the current uplink carrier indicate that the current uplink carrier will interfere with an uplink carrier of a neighboring femto node; and
　　　　means for selecting the current carrier if the interference to the neighbor is less than an uplink threshold; and
　　the means for repeating the comparing and selecting for the next carrier further comprises performing the repeating if the interference to the neighbor is equal to or greater than the uplink threshold.

24. The femto node of claim 21, further comprising means for determining interference characteristics of a set of uplink carriers, wherein a current uplink carrier is associated with the current carrier and wherein:
　　the means for selecting the current carrier further comprises:
　　　　means for determining an interference from a neighbor if the interference characteristics for an uplink carrier of a neighboring femto node will interfere with the current uplink carrier; and
　　　　means for selecting the current carrier if the interference from the neighbor is less than an uplink threshold; and
　　the means for repeating the comparing and selecting for the next carrier further comprises performing the repeating if the interference from the neighbor is equal to or greater than the uplink threshold.

25. A computer program product, comprising:
　　a non-transitory computer-readable medium comprising codes for causing a computer to:
　　determine a preference order for a set of downlink carriers available to a femto node;
　　measure a received signal strength for each carrier of the set of downlink carriers;
　　determine a least interference carrier from the set of downlink carriers responsive to the received signal strength for each carrier of the set of downlink carriers; and
　　define a selected carrier for the femto node from the set of downlink carriers responsive to a comparison of the received signal strength of the least interference carrier offset by a predefined margin to the received signal strength of at least one carrier of the set of downlink carriers, wherein the predefined margin is used to adjust a tradeoff between selecting the least interference carrier and concentrating the femto node on preferred carriers.

26. The computer program product of claim 25, wherein the codes for causing the computer to define a selected carrier for the femto node further cause the computer to:
　　compare the received signal strength for a current carrier of the set of downlink carriers to the received signal strength of the least interference carrier offset by the predefined margin;
　　select the current carrier if the received signal strength of the current carrier is less than or equal to the received signal strength of the least interference carrier offset by the predefined margin; and
　　repeat the comparing and selecting for a next carrier of the set of downlink carriers if the received signal strength of the current carrier is greater than the received signal strength of the least interference carrier offset by the predefined margin.

\* \* \* \* \*